United States Patent
Berlingerio et al.

(10) Patent No.: US 9,304,006 B2
(45) Date of Patent: Apr. 5, 2016

(54) JOURNEY COMPUTATION WITH RE-PLANNING BASED ON EVENTS IN A TRANSPORTATION NETWORK

(75) Inventors: Michele Berlingerio, Noicattaro (IT); Adi I. Botea, Dublin (IE); Eric P. Bouillet, Englewood, NJ (US); Francesco Calabrese, Dublin (IE); Olivier Verscheure, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

(21) Appl. No.: 13/600,903

(22) Filed: Aug. 31, 2012

(65) Prior Publication Data
US 2014/0067266 A1 Mar. 6, 2014

(51) Int. Cl.
*G01C 21/00* (2006.01)
*G01C 21/34* (2006.01)

(52) U.S. Cl.
CPC ........ *G01C 21/3423* (2013.01); *G01C 21/3415* (2013.01)

(58) Field of Classification Search
CPC ............... G08G 1/096844; G08G 1/096827; G01C 21/3423
USPC ........ 701/117, 400, 118, 465, 1, 19, 22, 6, 70
See application file for complete search history.

(56) References Cited

U.S. PATENT DOCUMENTS

| 5,400,020 | A | 3/1995 | Jones et al. |
| 5,948,040 | A * | 9/1999 | DeLorme ............... G01C 21/36 340/990 |
| 6,006,159 | A | 12/1999 | Schmier et al. |
| 6,580,998 | B2 * | 6/2003 | Flynn ..................... G01C 23/00 342/63 |
| 6,734,823 | B2 | 5/2004 | Mintz et al. |
| 7,324,893 | B2 | 1/2008 | Yamashita et al. |
| 7,603,281 | B1 | 10/2009 | Miller et al. |
| 7,914,100 | B2 | 3/2011 | Kashimoto et al. |
| 8,050,949 | B2 | 11/2011 | Purang et al. |

(Continued)

FOREIGN PATENT DOCUMENTS

| CN | 101123515 B | 6/2010 |
| CN | 101388143 B | 4/2011 |

(Continued)

OTHER PUBLICATIONS

Ackerman, et al., "Single-Bit Correct, Double-Bit Detect Error Checking/Correction Scheme"; http://www.ip/com/pubview/IPCOM000112383D; Mar. 27, 2005.

(Continued)

*Primary Examiner* — Truc M Do
(74) *Attorney, Agent, or Firm* — Cantor Colburn LLP

(57) ABSTRACT

Embodiments of the disclosure include a method for journey planning including receiving a journey planning request. The request includes an origin and a destination in a transportation network. The method also includes calculating an optimized journey plan based on the journey planning request and a route map corresponding to the transportation network and identifying a potential event in the transportation. The method further includes monitoring the transportation network for the potential event and based on detecting an execution of the potential event, calculating an improved journey plan.

24 Claims, 3 Drawing Sheets

(56) References Cited

U.S. PATENT DOCUMENTS

| | | | |
|---|---|---|---|
| 8,284,076 B1 | 10/2012 | Horstemeyer | |
| 2002/0002548 A1 | 1/2002 | Roundtree | |
| 2003/0055666 A1* | 3/2003 | Roddy et al. | 705/1 |
| 2003/0135304 A1 | 7/2003 | Sroub et al. | |
| 2003/0171939 A1* | 9/2003 | Yagesh et al. | 705/1 |
| 2004/0199415 A1 | 10/2004 | Ho | |
| 2004/0243430 A1* | 12/2004 | Horstemeyer | 705/1 |
| 2005/0164673 A1* | 7/2005 | Ehlers | 455/404.1 |
| 2006/0046732 A1* | 3/2006 | Grossman et al. | 455/450 |
| 2006/0155465 A1* | 7/2006 | Jung et al. | 701/209 |
| 2006/0178949 A1* | 8/2006 | McGrath | 705/26 |
| 2006/0212187 A1 | 9/2006 | Wills et al. | |
| 2006/0224426 A1* | 10/2006 | Goossens et al. | 705/8 |
| 2007/0052586 A1* | 3/2007 | Horstemeyer | 342/457 |
| 2008/0014908 A1* | 1/2008 | Vasant | 455/414.1 |
| 2008/0071466 A1 | 3/2008 | Downs et al. | |
| 2008/0158016 A1* | 7/2008 | Wang et al. | 340/993 |
| 2008/0275643 A1* | 11/2008 | Yaqub et al. | 701/209 |
| 2009/0005963 A1* | 1/2009 | Jarvinen | 701/201 |
| 2009/0030715 A1* | 1/2009 | Robb | G01C 21/3423 705/5 |
| 2009/0157298 A1* | 6/2009 | Kon et al. | 701/201 |
| 2010/0121563 A1* | 5/2010 | Chavez et al. | 701/201 |
| 2010/0145609 A1 | 6/2010 | Boss et al. | |
| 2010/0205021 A1 | 8/2010 | Jewett et al. | |
| 2010/0268447 A1* | 10/2010 | Griffiths | 701/200 |
| 2010/0280750 A1* | 11/2010 | Chen et al. | 701/204 |
| 2010/0332131 A1 | 12/2010 | Horvitz et al. | |
| 2011/0082636 A1 | 4/2011 | Barker et al. | |
| 2011/0112759 A1 | 5/2011 | Bast et al. | |
| 2011/0246246 A1 | 10/2011 | Johnson | |
| 2011/0301840 A1* | 12/2011 | Wang | 701/202 |
| 2012/0010803 A1 | 1/2012 | Min et al. | |
| 2012/0041675 A1* | 2/2012 | Juliver et al. | 701/465 |
| 2012/0053830 A1* | 3/2012 | Bach | 701/438 |
| 2012/0059578 A1 | 3/2012 | Venkatraman | |
| 2012/0066251 A1* | 3/2012 | Gontmakher et al. | 707/769 |
| 2012/0136561 A1 | 5/2012 | Barker et al. | |
| 2012/0226434 A1 | 9/2012 | Chiu | |
| 2012/0253867 A1 | 10/2012 | Davidson | |
| 2012/0290182 A1 | 11/2012 | Cooper et al. | |
| 2013/0060468 A1* | 3/2013 | Delling et al. | 701/527 |
| 2013/0073195 A1 | 3/2013 | Nesbitt et al. | |
| 2013/0096827 A1* | 4/2013 | McCall et al. | 701/533 |
| 2013/0144517 A1 | 6/2013 | Kickbusch | |
| 2013/0151111 A1* | 6/2013 | Skelton | 701/99 |
| 2013/0204525 A1* | 8/2013 | Pfeifle | 701/533 |
| 2013/0214940 A1* | 8/2013 | Sako et al. | 340/905 |
| 2013/0261956 A1* | 10/2013 | Marks | 701/425 |
| 2013/0265154 A1* | 10/2013 | Tumayan et al. | 340/539.13 |
| 2013/0304347 A1* | 11/2013 | Davidson | 701/99 |
| 2013/0325315 A1 | 12/2013 | Beaurepaire | |
| 2014/0012498 A1* | 1/2014 | Gustafson et al. | 701/468 |
| 2014/0012634 A1 | 1/2014 | Pearlman et al. | |
| 2014/0058674 A1 | 2/2014 | Shekhar et al. | |

FOREIGN PATENT DOCUMENTS

| | | |
|---|---|---|
| JP | 2001222796 A | 8/2001 |
| WO | 2008060308 A2 | 5/2008 |
| WO | 2011016901 A1 | 2/2011 |
| WO | WO2011016902 A1 | 2/2011 |

OTHER PUBLICATIONS

Damodaram, et al; "Error Detection and Correction Options for Data Services in B-ISDN"; GLOBECOM '90: IEEE Global Telecommunications Conference and Exhibition; Commuications: Connection to the Future:; pp. 1751-1757; vol. 3; IEEE; 1990.

Kerrigan, et al.; "Error Correction Procedure to Correct One Hard and One Soft Error Using a Single Error Correcting Code"; htpp://www.ip.com/pubview/IPCOM000047387D; Feb. 7, 2005.

Litwin, et al; "Error Control Coding"; IEEE Potentials, vol. 20, No. 1, pp. 26-28, Feb.-Mar. 2001.

\* cited by examiner

JOURNEY COMPUTATION WITH RE-PLANNING BASED ON EVENTS IN A TRANSPORTATION NETWORK

BACKGROUND

The present invention relates to journey planning in a transportation system, and more specifically, to journey planning with re-planning based on events in a transportation system.

In today's transportation systems, especially in multi-modal transportation systems, planning a journey from one location to another has become and increasingly complex problem. A journey plan is a planned route through a transportation network and may include one or more forms of transportation and one or more stops.

Often, journey plans are carried out in environments characterized by uncertainty and dynamic changes. For example, in a multi-modal transportation system the arrival and departure times of planes, busses and trains can vary depending on a wide variety of factors. In general, journey re-planning is a known strategy to handle unexpected situations that occur at the time of journey plan execution. For example, re-planning typically occurs when a delay arriving at a location forces the traveler to miss the planed next mode of transportation. Currently, existing journey re-planning systems trigger re-planning only when the current journey plan becomes invalidated by such an event. Other available journey re-planning systems perform brute-force re-planning, launching, for example, new planning rounds at fixed intervals.

SUMMARY

Embodiments include a method for journey planning, the method includes receiving a journey planning request, the request including an origin and a destination in a transportation network. The method also includes calculating an optimized journey plan based on the journey planning request and a route map corresponding to the transportation network and identifying a potential event in the transportation. The method further includes monitoring the transportation network for the potential event and based on detecting an execution of the potential event, calculating an improved journey plan.

Embodiments include a computer system for journey planning, the computer system including a journey planning server having a processor, the processor configured to perform a method. The method includes receiving a journey planning request, the request including an origin and a destination in a transportation network. The method also includes calculating an optimized journey plan based on the journey planning request and a route map corresponding to the transportation network and identifying a potential event in the transportation. The method further includes monitoring the transportation network for the potential event and based on detecting an execution of the potential event, calculating an improved journey plan.

Embodiments also include a computer program product for journey planning, the computer program product including a computer readable storage medium having computer readable program code embodied therewith. The computer readable program code including computer readable program code configured to perform a method. The method includes receiving a journey planning request, the request including an origin and a destination in a transportation network. The method also includes calculating an optimized journey plan based on the journey planning request and a route map corresponding to the transportation network and identifying a potential event in the transportation. The method further includes monitoring the transportation network for the potential event and based on detecting an execution of the potential event, calculating an improved journey plan.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, a method for journey planning includes re-planning triggering events that are not limited to events that invalidate a journey plan that is currently being executed. In exemplary embodiments, the journey planning method actively looks for opportunities to improve the journey plan that is currently being executed. For example, new opportunities may have been created by events in the transportation system since the planning of the current journey plan. Accordingly, even if the current journey plan is still valid, new events in the network could have created opportunities for better plans.

Figure 1:
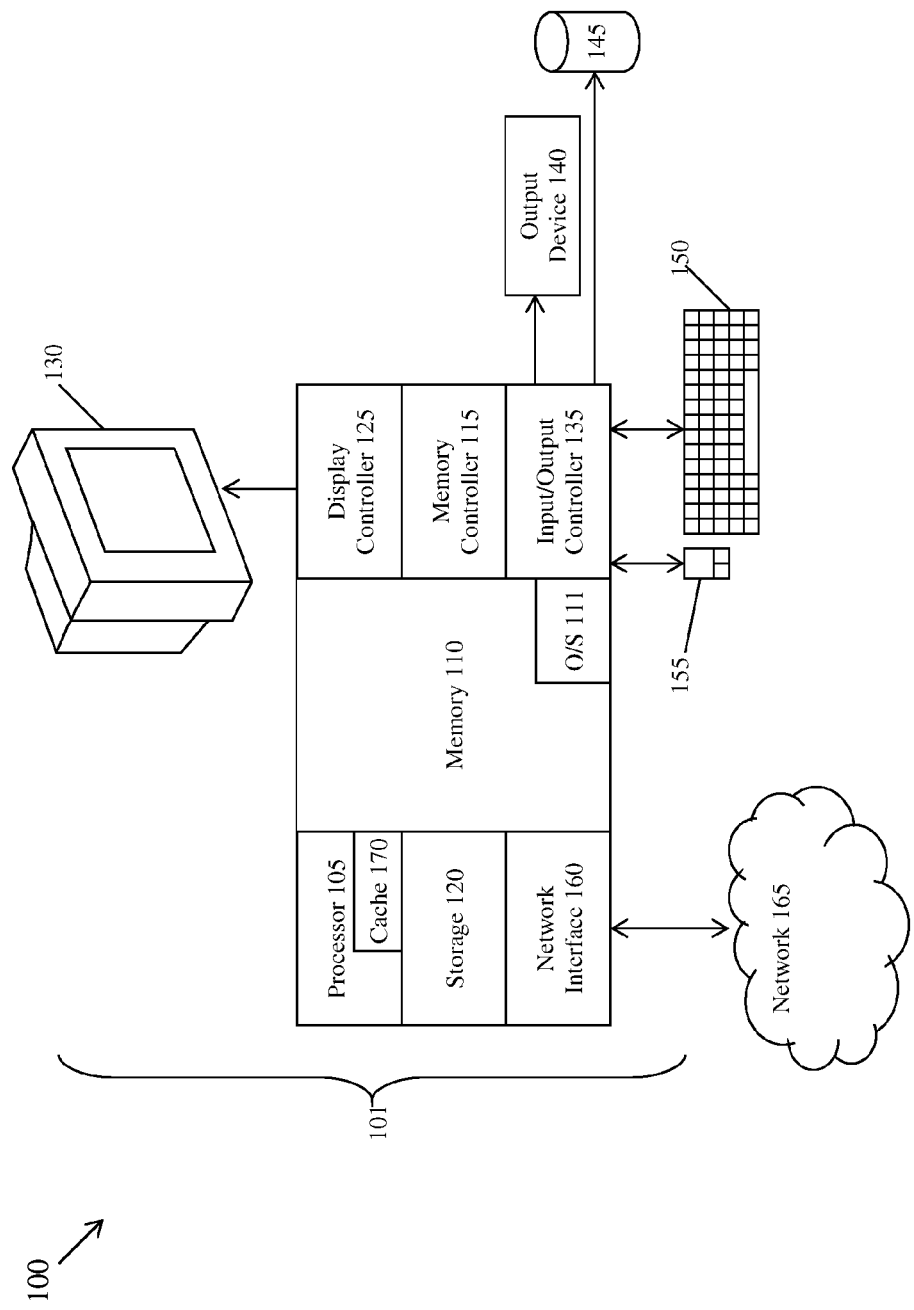
FIG. 1 illustrates a block diagram of a computer system for use in practicing the teachings herein.

FIG. 1 illustrates a block diagram of a computer system 100 for use in practicing the teachings herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The computer system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated. When the computer 101 is in operation, the processor 105 is configured to execute instructions stored within the memory 110, to communicate data to and from the memory 110, and to generally control operations of the computer 101 pursuant to the instructions.

Figure 2:
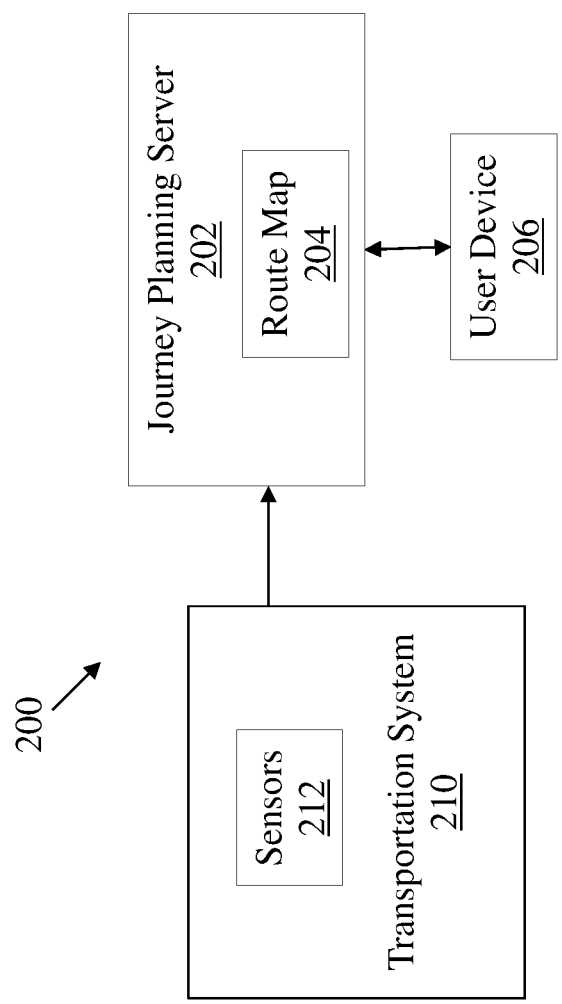
FIG. 2 illustrates a block diagram of a system for journey planning in accordance with an embodiment.

Referring now to FIG. 2, a block diagram of a system 200 for journey planning in accordance with an embodiment is shown. As illustrated the system 200 includes a journey planning server 202, a user device 206, and transportation system 210. In exemplary embodiments, the transportation system 210 may be a multi-modal transportation system that can include, but is not limited to, a bus transportation system, a rail transportation system, a ferry transportation system, an aviation transportation system, or the like. In addition, the transportation system 210 may include one or more sensors 212 that are configured to monitor the state of the transportation system 210. For example, the sensors may be global positioning system (GPS) sensors that are disposed on various pieces of equipment, such as a train or a bus, to track the position of the equipment. In exemplary embodiments, the journey planning server 202 may be a computer similar to the one shown and described in FIG. 1.

The system 200 also includes a journey planning server 202, which is configured to receive information from the transportation system 210 regarding the state of the transportation system 210. For example, the transportation system 210 may be configured to periodically update the journey planning server 202 with the information from the sensors 212. In one embodiment, the journey planning server 202 may constantly monitor the sensors 212 of the transportation system. In another embodiment, the transportation system 210 may be configured to only alert the journey planning server 202 upon the detection that a piece of transportation equipment is off schedule, out of service, or the like. In exemplary embodiments, the journey planning server 202 includes route map 204 that correspond to the transportation system 210. The route map 204 may include a map of the stops in the transportation system 210 and the schedules of the transportation equipment in the transportation system 210. The journey planning server 202 is configured to use the route map 204 to calculate an optimized journey plan in response to a journey plan request from a user.

In exemplary embodiments, the system 200 includes one or more user devices 206 that are configured to be used to request journey plans from the journey planning server 202. The user device 206 may include, but is not limited to, a cellular phone, a tablet device, a laptop computer, or the like. In exemplary embodiments, a user, via the user device, requests a journey plan from the journey planning server 202. The journey plan includes an origin and a destination and may include additional information such as route preferences, intermediate stops, or the like. In exemplary embodiments, the journey plan request may also include one or more optimization requests, such as fastest route, least expensive route, most direct route, or the like. Upon receiving a journey plan request from a user device, the journey planning server 202 calculates an optimized route based on the request and the route map 204. The optimized journey plan may then be sent to the user device 206. In exemplary embodiments, the user device 206 is configured to monitor the execution of the journey plan and to update the journey planning server 202 on any deviation from the journey plan.

In exemplary embodiments, the journey planning server 202 is configured to monitoring both the execution of the journey plan and the status of the transportation network and to triggering re-planning of the journey plan based on one or more monitored event. In exemplary embodiments, during the calculation of the optimized route the journey planning server 202 is configured to identify and store potential events which may be able to improve upon the optimized journey plan based upon events in the transportation network. For example, during the calculation of an optimized journey plan from point A to point C, assume the journey planning server 202 selects a bus from point A to B and a local train from point B to point C based on the route map 204. Assume that there is also an express train from point B to point C, but based on the expected arrival time of the bus from point A to point B, the traveler won't be able to catch the express train. In exemplary embodiments, the journey planning server 202 identifies a delay in the arrival of the express train from point B to C as a potential event and monitors the transportation network for the potential event. In one embodiment, such an event may include the arrival of the express trains at point B being delayed a sufficient amount of time to allow the traveller to catch the express train. In another embodiment, such an event may include the arrival of the bus at point B being early enough to allow the traveller to catch the express train. In exemplary embodiments, the journey planning server 202 is configured to monitor the transportation system 210 for the occurrence of a potential event both before and during the execution of the optimized journey plan.

Figure 3:
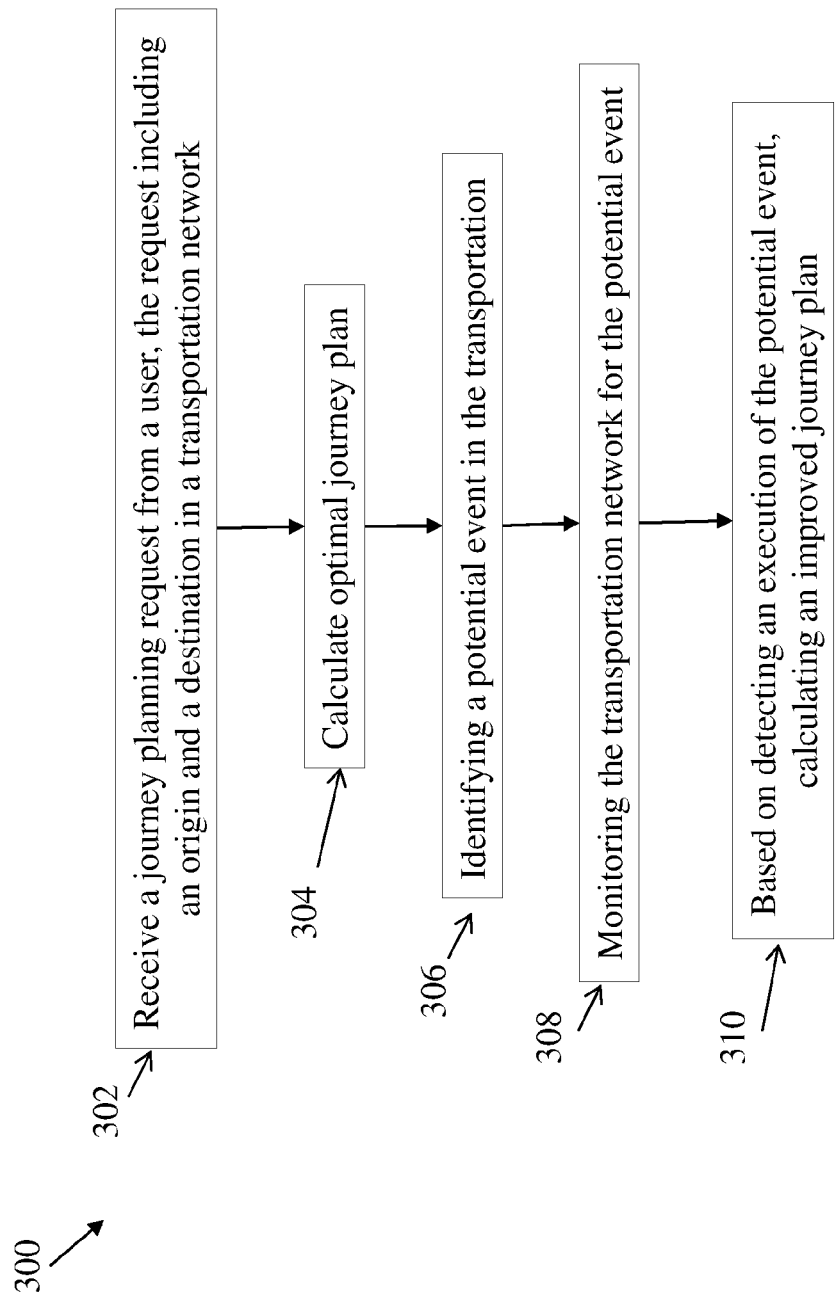
FIG. 3 illustrates a flow diagram of a method for journey planning in accordance with an embodiment.

Referring now to FIG. 3, a flow chart illustrating a method 300 for journey planning in accordance with an embodiment is shown. As shown at block 302, the method 300 includes receiving a journey planning request from a user. The journey planning request including at least an origin and a destination in a transportation network. Next, as shown at block 304, the method 300 includes calculating an optimized journey plan based on the journey planning request. As shown at block 306, the method 300 also includes a potential event in the transportation. Next, as shown at block 306, the method 300 includes monitoring the transportation network for the potential event. In exemplary embodiments, the monitoring of the transportation network for the potential event occurs while the optimized journey plan is being executed by the user. Based on detecting an execution of the potential event, the method 300 includes recalculating an optimized journey, as shown at block 310.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for journey planning, the method comprising:
    receiving a journey planning request, the request comprising an origin and a destination in a transportation network;
    calculating, by a processor, an optimized journey plan based on the journey planning request and a route map corresponding to the transportation network;
    identifying a potential event in the transportation network, wherein an occurrence of the potential event results in an ability to improve upon the optimized journey plan;
    monitoring the transportation network for the potential event, wherein said monitoring occurs during an execution of the optimized journey plan; and
    based on detecting an execution of the potential event, calculating an improved journey plan wherein the potential event is a change in a schedule of one or more elements of the transportation network that are not included in the optimized journey plan, wherein the improved journey plan is an improvement on the optimized journey plan.

2. The method of claim 1, wherein the transportation network is a multi-modal transportation network.

3. The method of claim 1, wherein the potential event is a change in an expected execution of the optimized journey plan.

4. The method of claim 1, further comprising: based on a determination that the improved journey plan is better than the optimized journey plan, transmitting the improved journey plan to a user.

5. The method of claim 1, wherein the journey planning request further comprises a preferred optimization method.

6. The method of claim 5, wherein the preferred optimization method comprises a fastest route.

7. The method of claim 5, wherein the preferred optimization method comprises a shortest route.

8. The method of claim 5, wherein the preferred optimization method comprises a least expensive route.

9. A computer system for journey planning, the computer system comprising:
    a journey planning server having a processor, the processor configured to perform a method comprising:
    receiving a journey planning request, the request comprising an origin and a destination in a transportation network;
    calculating, by a processor, an optimized journey plan based on the journey planning request and a route map corresponding to the transportation network;
    identifying a potential event in the transportation network, wherein an occurrence of the potential event results in an ability to improve upon the optimized journey plan;
    monitoring the transportation network for the potential event, wherein said monitoring occurs during an execution of the optimized journey plan; and
    based on detecting an execution of the potential event, calculating an improved journey plan, wherein the potential event is a change in a schedule of one or more elements of the transportation network that are not included in the optimized journey plan, wherein the improved journey plan is an improvement on the optimized journey plan.

10. The computer system of claim 9, wherein the transportation network is a multi-modal transportation network.

11. The computer system of claim 9, wherein the potential event is a change in an expected execution of the optimized journey plan.

12. The computer system of claim 9, further comprising: based on a determination that the improved journey plan is better that the optimized journey plan, transmitting the improved journey plan to a user.

13. The computer system of claim 9, wherein the journey planning request further comprises a preferred optimization method.

14. The computer system of claim 13, wherein the preferred optimization method comprises a fastest route.

15. The computer system of claim 13, wherein the preferred optimization method comprises a shortest route.

16. The computer system of claim 13, wherein the preferred optimization method comprises a least expensive route.

17. A computer program product for journey planning, the computer program product comprising:
   a non-transitory computer readable storage medium having computer readable program code embodied therewith, the computer readable program code comprising:
   computer readable program code configured for:
   receiving a journey planning request, the request comprising an origin and a destination in a transportation network;
   calculating, by a processor, an optimized journey plan based on the journey planning request and a route map corresponding to the transportation network;
   identifying a potential event in the transportation network, wherein an occurrence of the potential event results in an ability to improve upon the optimized journey plan;
   monitoring the transportation network for the potential event, wherein said monitoring occurs during an execution of the optimized journey plan; and
   based on detecting an execution of the potential event, calculating an improved journey plan, wherein the potential event is a change in a schedule of one or more elements of the transportation network that are not included in the optimized journey plan, wherein the improved journey plan is an improvement on the optimized journey plan.

18. The computer program product of claim 17, wherein the transportation network is a multi-modal transportation network.

19. The computer program product of claim 17, wherein the potential event is a change in an expected execution of the optimized journey plan.

20. The computer program product of claim 17, further comprising: based on a determination that the improved journey plan is better than the optimized journey plan, transmitting the improved journey plan to a user.

21. The computer program product of claim 17, wherein the journey planning request further comprises a preferred optimization method.

22. The computer program product of claim 21, wherein the preferred optimization method comprises a fastest route.

23. The computer program product of claim 21, wherein the preferred optimization method comprises a shortest route.

24. The computer program product of claim 21, wherein the preferred optimization method comprises a least expensive route.

* * * * *